July 21, 1953 L. SEJARTO ET AL 2,645,978
KEY DUPLICATING MACHINE
Filed April 19, 1949 5 Sheets-Sheet 1

INVENTORS.
LESTER SEJARTO.
SAMUEL J. STOLL.
BY
*Samuel J Stoll*
ATTORNEY.

July 21, 1953 L. SEJARTO ET AL 2,645,978
KEY DUPLICATING MACHINE
Filed April 19, 1949 5 Sheets-Sheet 2

INVENTORS.
LESTER SEJARTO.
SAMUEL J. STOLL.
BY
ATTORNEY.

July 21, 1953 — L. SEJARTO ET AL — 2,645,978
KEY DUPLICATING MACHINE
Filed April 19, 1949 — 5 Sheets-Sheet 3

INVENTORS.
LESTER SEJARTO
SAMUEL J. STOLL.
BY
Samuel J Stoll
ATTORNEY.

July 21, 1953 L. SEJARTO ET AL 2,645,978
KEY DUPLICATING MACHINE
Filed April 19, 1949 5 Sheets-Sheet 5

INVENTORS.
LESTER SEJARTO.
SAMUEL J. STOLL.
BY
ATTORNEY.

Patented July 21, 1953

2,645,978

UNITED STATES PATENT OFFICE 2,645,978

KEY DUPLICATING MACHINE

Lester Sejarto, Richmond Hill, and
Samuel J. Stoll, Flushing, N. Y.

Application April 19, 1949, Serial No. 88,372

4 Claims. (Cl. 90—13.05)

This invention relates to a key duplicating machine in which key blanks are cut in accordance with a master or pattern key. It constitutes an improvement over the invention disclosed and claimed in pending patent application Serial No. 785,264 filed on November 12, 1947 by Martin Stolove and John Walker Hopkins, Sr. now Patent No. 2,467,575, granted April 19, 1949.

The principal object of this invention is the provision of a fully automatic key duplicating machine which automatically clamps a pattern key and key blank in operative position and then automatically cuts the key blank in accordance with the pattern of the pattern key. The clamping means of the present invention is well adapted to accommodate pattern and blank keys of varying thicknesses. The clamping means herein claimed automatically and accurately positions both the pattern key and the key blank preparatory to the cutting operation and automatic pattern key following and blank key cutting means are provided for faithfully and accurately duplicating the key blank to the contours of the pattern key.

The machine herein described and claimed makes use of spring tension means for positioning the pattern key and key blank in proper operative position and it makes use of electromagnetic means for removing the spring positioning means in order to provide access to the pattern key and key blank on the part of the pattern key follower and the blank key cutter. Cam means are provided for clamping the two keys in operative position preparatory to the cutting operation.

The sequence of events which take place during the course of a complete operation or cycle may be stated as follows: the pattern key and key blank are manually inserted into the keyways provided therefor in the machine. Spring means automatically engage the two keys to put and hold them in proper operative position. A switch is then manually closed to close the circuit to the electric motor which powers the machine. The electric motor, operating through belt and pulley means, a gear box and a cam, moves the pattern key follower and blank key cutter in the direction of the pattern and blank keys. The electric motor also causes the cutter to rotate at an appropriate rate of speed. As this movement of the pattern key follower and blank key cutter commences in the direction of said keys, a cam automatically causes two clamps to engage said keys and to hold them in operative position. A second switch now automatically closes and a second circuit is closed to electromagnetic means which is connected to the positioning means aforementioned. When said electromagnetic means is thus energized, it acts upon the positioning means to remove said positioning means from engagement with the keys, thereby rendering said keys accessible to the key following and key cutting members. The electric motor continues to move the pattern key follower and key blank cutter toward said pattern and blank keys respectively and as they approach said keys, they are automatically caused to pivot into engagement with them, thereby cutting the blank key in accordance with the pattern of the pattern key. The electric motor continues to act upon the key follower and key cutter until the cutting operation comes to an end and it then removes said follower and said cutter from engagement with said pattern and blank keys. The second switch now automatically opens and the electromagnetic means is thereby de-energized, releasing the spring tension positioning means to re-engage the two keys, following which the key clamps automatically free the keys for removal from the machine. At the conclusion of the cutting operation, the first mentioned switch automatically opens and the entire cycle is at an end. The keys may then be withdrawn manually from the machine.

One of the objects of this invention is the provision, in a machine of the character described, of improved key holding clamps. These clamps are substantially L-shaped to engage the shank of the key and also its finger piece or handle. The clamping jaws engage a narrow portion of the key shank and were it not for the fact that they also engage the finger piece of the key, their grip upon the key would be much too weak. It is the combined grip upon the key shank and the finger piece of the key that enables the clamping jaws to hold the key in rigid, operative position. The clamps are also automatically adjustable to accommodate keys of varying thicknesses. It is well known that some keys are thicker and heavier than other keys but it is not as well known that some key blanks are thicker or thinner than the pattern keys which they are to duplicate. The clamps of the present invention are automatically adapted to accommodate a pattern key which is thicker or thinner than the key blank and a key blank which is thicker or thinner than the pattern key.

Another object of this invention is the provision of improved key positioning means for holding the keys in operative position preparatory to the clamping action of the clamping means and the cutting action of the cutting means. The positioning means comprises a leaf spring which engages the key when it is inserted into the keyway and it tensionally holds the key tightly against a guide wall. A solenoid is used to move said positioning means out of engagement with the key an instant following engagement of the key by the clamping means. The movement of the positioning means out of engagement with the key is required to be virtually instantaneous and the use of a solenoid to accomplish this result is decidedly advantageous.

There are many other objects of and advantages in the present invention and among these is its improved constructional features which simplify production and make for greater accuracy in operation. For example, each important operation of the machine may be advanced or retarded in point of time relative to the other operations of the machine. Adjusting means is provided to enable the clamp working cam to go into action sooner or later, as desired. Adjustable means are provided for determining the time that solenoid goes into operation.

A preferred form of this invention is shown in the accompanying drawing in which:

Fig. 22 is a side view of the pattern and blank keys showing them in operative position in respect to the pattern key follower and blank key cutter;

The machine herein shown and claimed includes a pan-shaped base 20 and a hood or cover member 21 for said base. The hood is open at the front and a front plate 22 is provided as a closure therefor. A drawer 23 is provided in base 20 to collect the filings during the course of each key duplicating operation. As will clearly be seen in the drawing, this drawer is situated immediately below the key cutter and it will be understood that the drawer may be withdrawn from the base to empty the filings. The hood is removable from the base to expose the working mechanism of the machine and said mechanism may be operated when the hood is removed from the base equally as well as when the hood is mounted on the base. The hood merely protects the mechanism; it does not in any way support the mechanism.

A front bearing support 30 and a back bearing support 31 support the main shaft 32 of the operating mechanism. The shaft is mounted, as the drawing clearly shows, on a horizontal line which extends from the front to the back of the machine, substantially midway between the sides thereof. This shaft is fixedly supported on said bearing supports so that it cannot move relatively thereto. Said supports are affixed to the base by conventional means such as screws or bolts. They may of course be cast integrally with the base structure, if desired.

Rotatably mounted on shaft 32 is a cam 35. This cam is of cylindrical shape and its cam slot or groove 36 extends fully around it. A cam follower 37 supported on bracket 38 which is affixed to the back bearing support 31 engages said cam slot 36. The cam follower 37 is fixed in position relative to the base structure but the cam is free to rotate on shaft 32. It will be seen in the drawing that a cam housing 39 encloses the cam but said housing has an opening 40 formed in the bottom thereof to provide access to the cam on the part of the cam follower.

Cam housing 39 is affixed by means of screws or other conventional fastening means to a gear box or housing 45. This gear box is also pivotally mounted on shaft 32. It houses a plurality of speed reducing gear wheels 35a, 35b, 35c and 35d, gear wheel 35a being directly connected to said cam by means of bolts or screws 35e. Also connected to said speed reducing gear train is a pulley 46 and said pulley is connected by means of a belt 47 to a pulley 48 on shaft 49 on motor 50. Motor 50 is mounted on gear housing 45 in the manner shown in the drawing, that is it is situated on one side of shaft 32 and pulley 46 is situated on the opposite side. Thus it is that when the motor is in operation, pulley 46 is caused to rotate, and with it the gear train and cam 35. Since the gear train is of a speed reducing nature, cam 35 is caused to rotate at a relatively slow rate of speed. In the preferred form of this invention, cam 35 consumes approximately half a minute for each complete revolution. Motor pulley 48 is shown to be considerably smaller than driven pulley 46 and it will therefore be understood that pulley 46 also rotates at a much slower speed than the motor itself.

Figure 7:
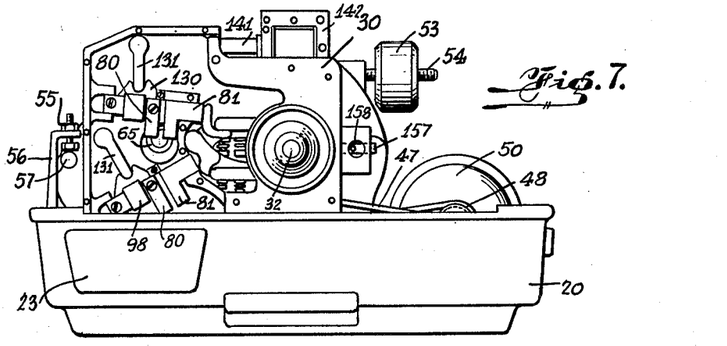
Fig. 7 is a front view of said machine with its hood or top cover removed therefrom, said view being as seen on the line 7—7 of Fig. 4.
Figure 8:
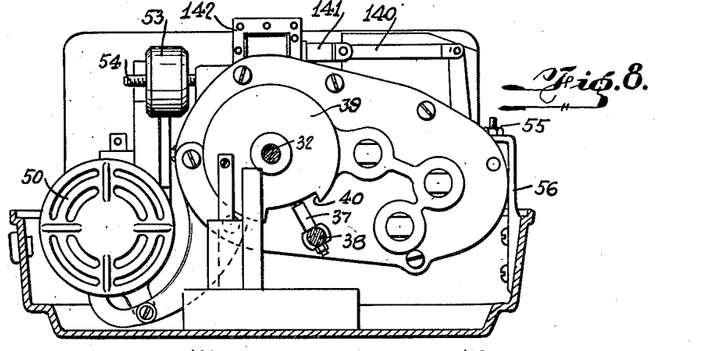
Fig. 8 is a back view of the machine with its hood or top cover removed therefrom and its supporting base cut away and in section to expose the operative parts of the machine, said view being on the line 8—8 of Fig. 4.
Figure 9:
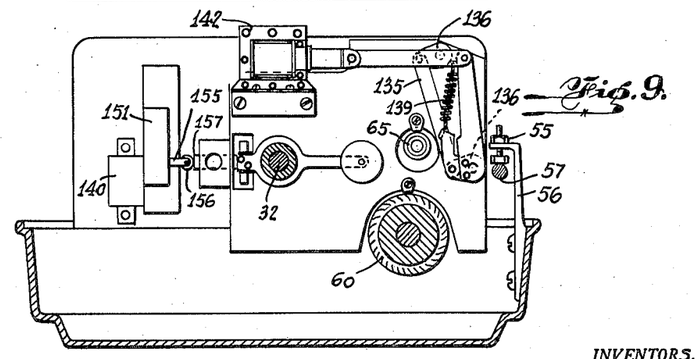
Fig. 9 is a vertical section on the line 9—9 of Fig. 4.

The cam, the cam housing, and the gear housing are all slidably movable on the shaft, longitudinally thereof. It will be recalled that cam 35 is engaged by a fixed cam follower 37. Hence when the cam rotates, the entire assembly including the cam, its housing, the gear housing, the motor and the pulleys is caused to move longitudinally of the main shaft, first forwardly and then backwardly. When viewed from the front, see Fig. 7, the motor is situated on the right side of shaft 32. The weight of the motor therefore tends to pivot the entire assembly last above mentioned in clockwise direction. A weight 53, adjustably mounted on a screw threaded stud 54 which is affixed to gear housing 45 adds its weight to the weight of the motor in urging the assembly to pivot on shaft 32 in clockwise direction. The other side of the assembly, where pulley 46 is situated, tends to pivot upwardly in the same clockwise direction. A stop member 55 is provided to limit such pivotal movement to a given or predetermined point. This stop member 55 comprises a vertically extending screw member which is supported by a post 56 mounted on base 20. A horizontal arm 57 is affixed to the gear housing for engagement with said adjustable stop member 55 to prevent clockwise pivotal movement of the assembly aforementioned beyond a predetermined point. The length of arm 57 corresponds to or exceeds the distance which the assembly aforementioned travels from the back of the machine to the front so that the assembly is always subject to the control of stop member 55 irrespective of its longitudinal position on shaft 32.

The key cutter 60 is mounted on pulley 46. It will be noted that said pulley tapers from its belt receiving peripheral groove to its cutter supporting portion. Actually this pulley is a casting which is designed to serve both as a pulley and as a cutter support. A nut 61, screwed to a thread portion of the pulley abuts cutter 60 and secures said cutter to the pulley. The cutter may be removed and replaced by simply removing nut 61 from pulley 46. Removal of the cutter may take place through the opening in base 20 in which drawer 23 is normally disposed.

Situated above pulley 46 and secured to housing 45 is a horizontally extending arm 64 having a portion 64a which extends into and is secured to wall 45a of housing 45 and it will be noted that said arm supports key follower 65. The key follower is mounted on a shaft 66 and it will be seen that said shaft is adjustably supported by arm 64. A set screw 67 affixes said shaft to said arm. It will be clear therefore that the key follower may be positioned in any selected position relative to the key cutter. In the preferred form of this invention, the key cutter and the key follower are in accurate and precise alignment with each other. Since they are both mounted on the same support, namely gear housing 45, they are fixed in relation to each other and they engage the blank and pattern at points which are equidistant from the axial center of shaft 32. The key cutter of course rotates but the key follower does not necessarily rotate and no means is provided in the preferred form of this invention for such rotation. It may however be found desirable to cause the key follower to rotate as well as the key cutter, since such rotary movement of the key follower would facilitate its movement along the pattern key.

It will be seen in Fig. 22 that when pattern key 70 is properly positioned in the machine, key follower 65 is free to engage and move along it. The weight of the motor will tend to maintain the follower in engagement with the pattern and the cutter in engagement with the blank. It will also be seen in said Fig. 22 that when the key blank 71 is properly positioned in the machine, key cutter 60 is free to engage and move along it. By proper position is meant a horizontal position in which the key extends on a line from front to rear of the machine, the back of the key extending upwardly and its toothed or notched portion extending downwardly. It will therefore be seen that the key follower and key cutter engage the lower or notched portions of the keys and that their forward and backward movement is below the keys. This arrangement prevents the chips or filings from interfering with the operation of the key positioning and clamping means hereinafter described.

Figure 1:
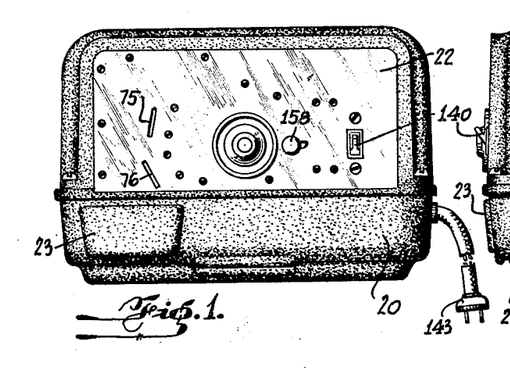
Fig. 1 is a front view of the entire machine, showing all of its working parts enclosed.
Figure 2:
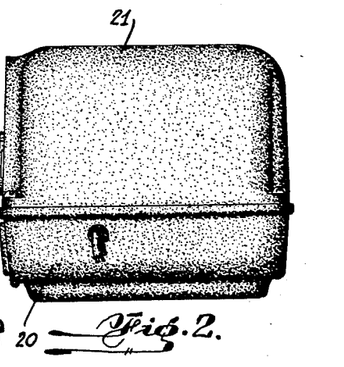
Fig. 2 is a side view thereof.
Figure 3:
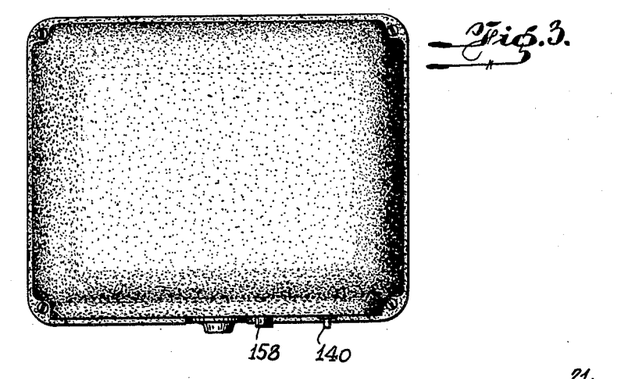
Fig. 3 is a top view.
Figure 4:
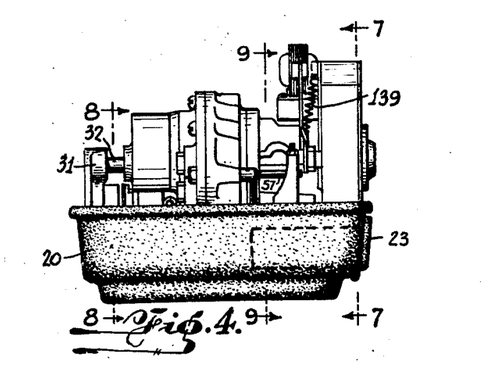
Fig. 4 is a side view of the machine with its hood or top cover removed therefrom.
Figure 5:
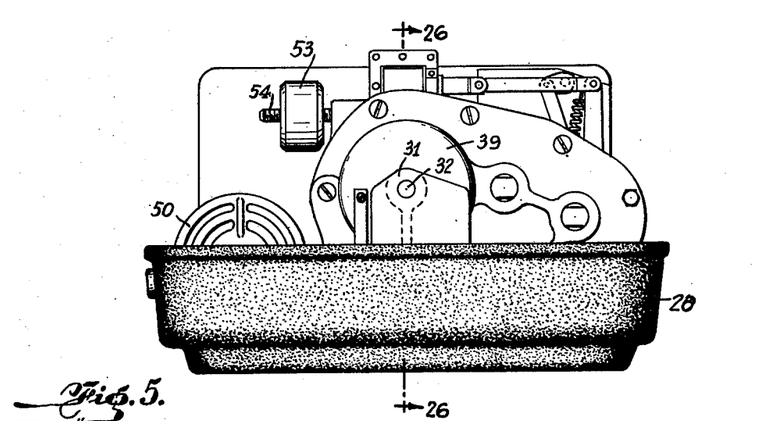
Fig. 5 is a back view of said machine with its hood or top cover removed therefrom.

It will be seen in Fig. 1 that keyholes 75 and 76, respectively, are provided in the front plate or panel 22. It is through said keyholes that the pattern and blank keys are inserted into the machine. Keyways are provided for said keys immediately behind keyholes 75 and 76. These keyways are formed between the jaws of the clamps which will shortly be described, said clamps providing the top and two side walls and the key positioning means providing the bottom wall.

There are two clamps, one for the pattern key and the other for the key blank. Each clamp comprises a fixed jaw 80 and a movable jaw 81. The movable jaw is clearly shown in Figs. 15, 16 and 17 and the fixed jaw is clearly shown in Figs. 18, 19 and 20. Referring now to the movable jaw, it will be seen that it includes a horizontal portion 82 which engages the shank of the key and a downwardly extending portion 83 which engages the finger piece of the key. The two portions 82 and 83 are seen to resemble an inverted L. Fixed jaw 80 also has a horizontally extending portion 84 and a downwardly extending portion 85 which correspond, respectively, to portions 82 and 83 of the movable jaw. Horizontal portion 84 engages the shank of the key and downwardly extending portion 85 engages its finger piece. A compression spring 87 is mounted in movable jaw 81 for engagement with fixed jaw 80. This compression spring serves to separate the two jaws to enable the operator of the machine to insert the keys between said jaws.

Figures 11, 15, 16, 17, 18, 19, 20, 21, 21A, 23:
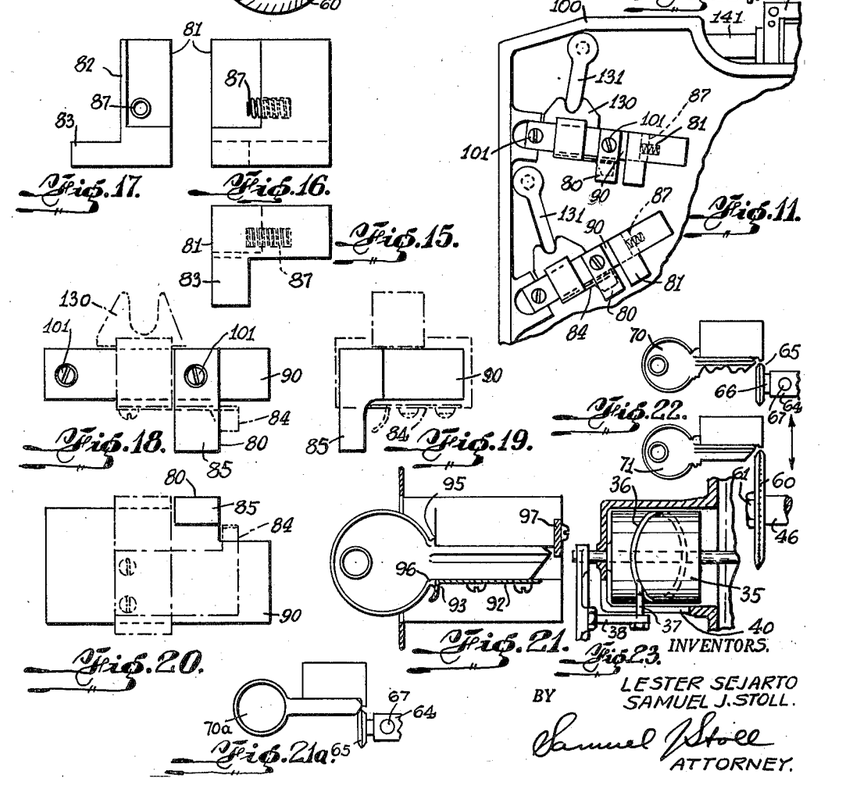
Fig. 11 is a fragmentary view of the key holding mechanism showing said mechanism in inoperative position.
Fig. 15 is a front view of the movable jaw of one of the clamps.
Fig. 16 is a top view thereof.
Fig. 17 is a face view thereof.
Fig. 18 is a front view of the fixed jaw of one of said clamps.
Fig. 19 is a face view of said fixed jaw.
Fig. 20 is a bottom view thereof.
Fig. 21 is a side view of a key which is shown being held in operative position by the spring positioning means, said positioning means being shown in vertical section.
Fig. 21a is a side diagrammatic view of a key whose forward end abuts a stop member to position it relative to the key follower, said key being of the type which has no shoulders adjacent its fingerpiece.
Fig. 23 is a sectional view through the main cam housing showing a side view of the cam which moves the key follower and key cutter into and out of engagement with the pattern and blank keys respectively.

Fixed jaw 80 includes a transversely extending horizontal bar 90 which projects on both sides of the jaw proper. That portion of bar 90 which is on the right side of the fixed jaw, as seen in Fig. 18, provides the top wall of the keyway and it is against said bar or top wall that the key abuts when it is in operative position in the keyway. See Fig. 21. This far the top and side walls of each keyway have been described.

The bottom wall comprises a leaf spring 92 which is bent at 93 to provide a shoulder or stop. It will be seen in the drawing that the keys which are therein illustrated are provided with top and bottom shoulders 95 and 96, respectively. The bottom shoulder of each key abuts shoulder or stop 93 formed on leaf spring 92, so that it may be accurately aligned with the other key. Top shoulder 95 of each key also abuts the top wall or bar 90 of the keyway and this too assists in aligning the two keys. There are some keys which have only a bottom shoulder and in the case of such keys, stop 93 on the leaf springs alone serves to align the keys. There are still other keys in which no shoulders whatsoever are provided and a secondary stop member 97 is provided in the back of each keyway to engage the point or forward end of each key for the purpose of aligning the keys. Secondary stop member 97 is simply a projection which extends into each of the two keyways. It may be integral with the fixed jaw or it may be attached thereto or it may be connected to the supporting structure which supports the fixed jaws.

Figures 10, 12, 13, 14:
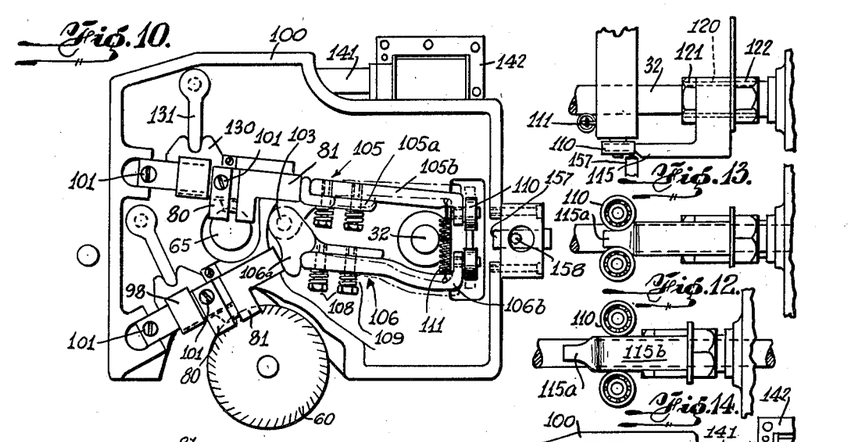
Fig. 10 is a front view of the key following and cutting members, of the key positioning mechanism and of the key clamping mechanism.
Fig. 12 is a side view of the clamp actuating cam, showing it in inoperative position relative to the clamps.
Fig. 13 is a top view thereof.
Fig. 14 is a side view, similar to that of Fig. 12, showing the cam in operative position relative to the clamps.

There are two leaf springs 92, one for the pattern key and one for the key blank. These leaf springs are identical and each is affixed to a sleeve 98 which is slidably mounted on that portion of bar 90 which extends leftwardly of fixed jaw 80, as seen in Figs. 10 and 18. When sleeve 98 is positioned over to the right as far as it will go, the leaf spring which it carries extends across the keyway and forms the bottom wall thereof. When the sleeve is moved leftwardly, its leaf spring moves with it away from the keyway and thus the keyway is left with top and side walls but without a bottom wall. The means by which such movement of the sleeves from side to side is caused will hereinafter be described.

A housing 100 is affixed to supporting bracket 30 by conventional means such as screws and bolts. This housing 100 houses the key positioning mechanism and the key clamping mechanism. Fixed jaws 80 are fastened to housing 100 by means of screws 101. Movable jaws 81 are slidably mounted in channels formed in said housing 100 for movement on a line with bars 90 of the fixed jaws. Pivoted at 103 are two bell cranks 105 and 106, respectively, and it will be noted that these bell cranks abut the movable jaws 81. When the bell cranks are worked in the manner hereinafter described, they urge the movable jaws 81 to move in the direction of the fixed jaws against the action of compression springs 87. When such movement of the movable jaws takes place, the pattern and blank keys are engaged and clamped tightly in operative position. When the bell cranks are pivoted in opposite directions, the movable jaws disengage the keys and free them for removal from their respective keyways.

Bell crank 105 comprises a pair of members 105a and 105b, respectively, which are held together by means of bolts 108. Strong compression springs 109 are interposed between the heads of said bolts and member 105a, so that the two members are actually held together by strong tension means. The tensional force which the springs exert may be varied by either loosening or tightening the bolts. Bell crank 106 is also divided into two parts, 106a and 106b, respectively, and these two parts are also held together by means of bolts 108 and compression springs 109. At the very end of members 105b and 106b ball bearing rollers 110 are mounted. A tension spring 111, interengaging said arms 105b and 106b tends to pull said arms together, thereby tending to move bell crank parts 105a and 106a out of engagement with the movable jaws 81.

A cam 115 is pivotally mounted on shaft 32. It is fixed against axial movement relative to gear housing 45 so that when said housing moves forwardly and backwardly on said shaft 32, the cam moves with it. When the cam is in retracted position, see Fig. 12, its small end portion 115a projects between the two rollers 110. When it moves forwardly with the gear housing, its heavier portion 115b pushes its way between the two rollers 110 and forces them apart. See Fig. 14. This has the effect of causing the two bell cranks 105 and 106 to pivot in opposite directions and to engage movable jaws 81, thereby compelling said movable jaws to move inwardly toward the fixed jaws in clamping engagement with the keys. When the cam moves backwardly, its heavy portion disengages rollers 110 and the bell cranks are thereby freed for return movement toward each other in response to the action of tension spring 111 upon them. Compression springs 87 are now free to move the movable jaws away from the fixed jaws and the keys are thereby released so that they may be removed from their respective keyways.

It has been stated that cam 115 is pivotally mounted on shaft 32. This feature is intended to enable the clamps to simultaneously accommodate keys of different thicknesses. If the pattern key which is inserted into the top keyway happens to be heavier than the key blank which is inserted into the lower keyway, there will be greater movement of bell crank 106 in the direction of the key blank than of bell crank 105 in the direction of the pattern key. Hence cam 115 will pivot downwardly to compensate for the different thicknesses of the two keys and for the different movements of the two bell cranks.

Although cam 115 has been described as being pivotally mounted on shaft 32, actually it is mounted on a sleeve 120 which itself is slidably and rotatably mounted on said shaft 32. A pair of nuts 121 and 122 on said sleeve flank that portion of the cam which is mounted on said sleeve and by adjusting said nuts, the cam may be adjustably positioned axially of the sleeve and hence of the gear housing. This adjustment feature is useful in either retarding or advancing the clamping action upon the keys so as to synchronize the clamping action with the other elements of the machine.

Sleeves 98 which carry leaf springs 92 are slidably movable, as has above been indicated on bars 90. Each sleeve 98 has a saddle-shaped upper portion 130 which is engaged by means of a finger 131, which is pivotally mounted on housing 100. Since there are two sleeves 98, there are also two fingers 131 and these fingers are shown to be connected by means of link 135 and arms 136. These arms and fingers are, in effect, a pair of bell cranks which are actuated by means of lever arm 138 against the action of tension spring 139. This lever arm is connected by means of link 140 to plunger 141 of solenoid 142. When the solenoid is energized, fingers 131 are caused to pivot in clockwise direction, thereby moving sleeves 98 leftwardly on their respective bars 90. When the solenoid is de-energized, spring 139 returns said fingers and said sleeves to their original positions, as shown in Fig. 10. Fig. 11 shows their leftward position under the influence of the energized solenoid.

The effect of such movement of fingers 131 and sleeves 98 is to move the leaf springs 92 out of engagement with the pattern and blank keys and then back again into engagement therewith. When the keyways are free of keys, the leaf springs are free to move across said keyways and to constitute the bottom walls thereof. When the keys are inserted into the keyways, these springs tend to push the keys upwardly against the top walls of the keyways, as Fig. 21 clearly shows. When the solenoid is energized, the leaf springs are removed from engagement with the keys and the keyways are thereby left without a bottom wall. It is necessary of course that the clamps be actuated at this time to prevent the keys from falling through the openings at the bottom of the keyways. The keys are now exposed to the key follower and key cutter for the cutting operation. At the conclusion of the operation, the solenoid is de-energized and spring 139 returns the leaf springs 92 into engagement with the keys, once again positioning the keys in the keyways. The clamps may now be released because the keys are no longer free to fall through the openings in the bottom of the keyways.

Figure 24:
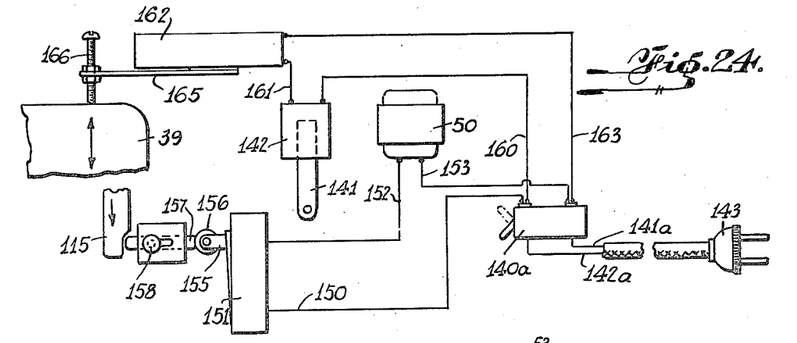
Fig. 24 is a diagrammatic view of the electrical circuits of the machine.
Figure 25:
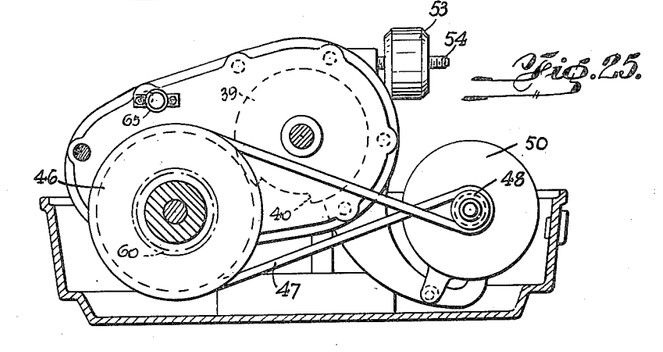
Fig. 25 is a vertical section on the line 25—25 of Fig. 6.
Figure 26:
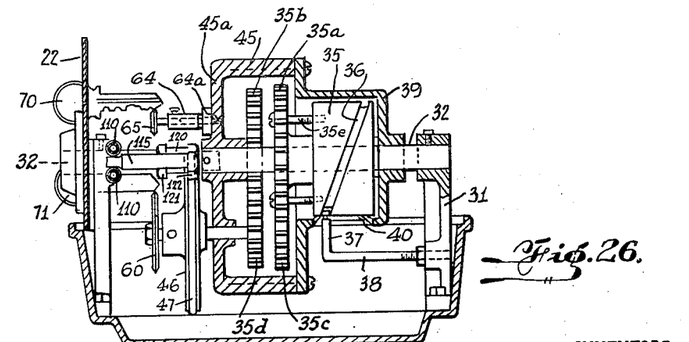
Fig. 26 is a vertical section on the line 26—26 of Fig. 5, the electrical apparatus being omitted from said view for purposes of clarity.

The electrical system of the apparatus hereinabove described synchronizes the workings of the several working pairs of the mechanism. The first step in the process of duplicating a key involves putting the pattern and blank keys into their respective keyways. The leaf springs position the two keys in proper position for the cutting operation. A switch is now closed and the circuit to the electric motor is likewise closed. The motor drives the belt and pulley above described as well as the gears in the gear box and the main cam in the cam housing. The cutter also is caused to rotate. The effect of such action is to cause the entire carriage, which is pivoted on shaft 32, to move forwardly, this carriage including the cam housing, the main cam, the gear box, the key follower and key cutter and also cam 115. As this carriage moves forward, cam 115 spreads the two bell cranks 105 and 106 apart and thereby causes the movable clamp jaws to engage the keys. An instant later, a second switch closes and a circuit is closed to the solenoid, thereby energizing the solenoid and causing it to pull the leaf springs 92 away from the keys. Continued forward movement of the carriage brings the pattern key follower and the blank key cutter into engagement, respectively, with the pattern and blank keys, and the cutting operation takes place. The weight of the motor and of adjustable weight 53 tends to hold the key follower and key cutter in operative engagement with said keys. After the carriage moves as far forward as the main cam will allow it to go, it starts on its backward movement to its original position. The cutting operation is repeated. At the conclusion of the cutting operation, the second mentioned switch is automatically opened, thereby de-energizing the solenoid and causing the leaf springs to re-engage the keys in response to the action thereon of tension spring 139. Following this, the clamping cam 115 releases the two bell cranks 105 and 106 respectively and thereby causes the movable clamping jaws to release the keys. When the carriage reaches its original position of rest, the first mentioned switch automatically opens and the circuit to the motor is broken. The cutting operation is now completed and the keys may be removed from their respective keyways. The electric diagram is best shown in Fig. 24. The main switch is a double pole switch 140a which is mounted on the face plate 22 of the cabinet. This main switch is connected by means of conductors 141a and 142a, respectively, to a conventional plug 143, which may be introduced into a conventional electric socket or receptacle. There are two main circuits in the machine: the first circuit controls the electric motor; the second circuit controls the solenoid.

Referring now to the first circuit, it will be seen in Fig. 24 that the main switch is connected by means of conductor 150 to a normally open microswitch 151. Said microswitch is connected by means of conductor 152 to one side of motor 50 and the opposite side of the motor is connected by means of conductor 153 to said main switch 140a. Hence when the main switch is open, the motor must remain idle. The main switch may be closed however and the motor still remain idle if the microswitch 151 is not closed. Hence, to operate the motor, it is necessary to close main switch 140a and microswitch 151.

Microswitch 151 has an actuating arm 155 on which a roller 156 is mounted. This actuating arm is spring urged outwardly from the microswitch so that it is necessary to press said arm inwardly in order to close said microswitch. Roller 156 of said actuating arm abuts a thrust rod 157 which is controlled by a push button 158. Thrust rod 157 also abuts cam 115. This cam, as Figs. 12 and 14 clearly show, has two cam surfaces, one on the top and one on the bottom to engage rollers 110. But as Fig. 24 also clearly shows, said cam has a cam face on its side which is situated for engagement with thrust rod 157, when said cam moves forwardly. In order to start the machine, main switch 140a is manually closed. Push button 158 is then pushed to the right, as seen in Fig. 24, until actuating arm 155 of microswitch 151 closes said microswitch. The motor is now energized and the entire movable carriage of the machine moves forwardly, including cam 115. The side cam face of said cam now engages thrust rod 157 and holds the actuating arm 155 in closed position without any manual aid on the part of the operator of the machine. When the carriage returns to its original position in the back of the machine, cam 115 disengages rod 157 and actuating arm 155 is thereby enabled to open the microswitch 151. This has the effect of breaking the circuit to motor 50 and the operation of the machine comes to an end.

Figure 6:
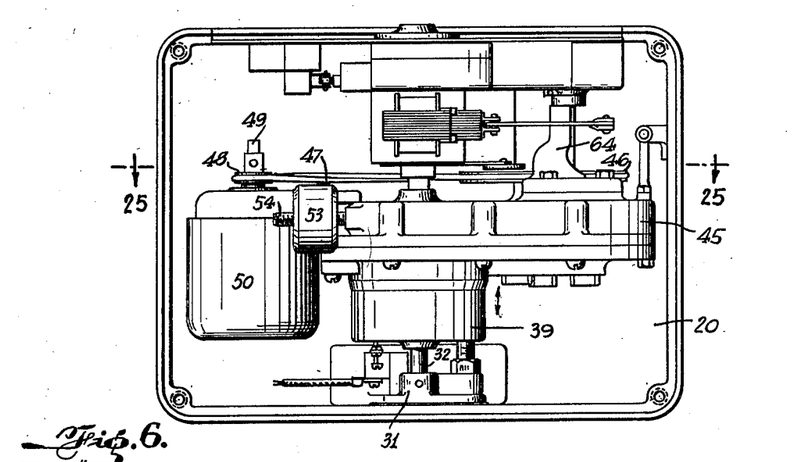
Fig. 6 is a top view of said machine, also with its hood or top cover removed therefrom.

The second circuit above mentioned includes conductor 160 which is connected to the main switch and to solenoid 142, a conductor 161 which connects the solenoid to a normally closed microswitch 162, and a third conductor 163 which connects said microswitch to the main switch 140a. When the main switch is closed and microswitch 162 is open, the solenoid is idle. When both the main switch and microswitch 162 are closed, the solenoid is energized. Microswitch 162 has an actuating arm 165 with an adjustment screw 166 mounted thereon. Said adjustment screw is situated for engagement with some part of the movable carriage above described. In one form of the invention, it is situated for engagement with cam housing 39, as Figs. 6 and 24 clearly show. When the cam housing is in its position of rest, it engages screw 166 and arm 165 is held in its open position with respect to microswitch 162. When motor 50 is energized and the carriage, including cam housing 39, is caused to move forwardly, said cam housing disengages screw 166 and enables actuating arm 162 to move into closed position, thereby closing microswitch 162 and energizing the solenoid. On the return trip of the carriage, cam housing 39 re-engages screw 166 and forces actuating arm 165 back into open position, thereby de-energizing the solenoid.

The foregoing is descriptive of a preferred form of this improved machine and it will be appreciated that many modifications and variations may be incorporated therein within the broad scope and spirit of the invention. For example, the linkage between the solenoid and the leaf springs may very obviously be simplified without doing violence to the spirit of the invention.

We claim:

1. A key duplicating machine comprising a frame, a carriage horizontally and pivotally movable on said frame, a pair of slots in said frame for reception of a pattern and a blank, a pattern follower and a blank cutter mounted on said carriage and movable therewith, motor driven cam means operating between said carriage and frame for horizontally moving said carriage, follower and cutter toward and away from said pattern and blank, a weight on said carriage causing it to pivot on said frame in the direction of said pattern and blank, thereby bringing said follower and cutter into operative engagement with said pattern and blank, a pair of supports, one for said pattern and one for said blank movably mounted on said frame, tension means connected to said supports for moving them into supporting position relative to said slots, a solenoid connected to said supports and operating in opposition to said tension means for moving said supports out of supporting position relative to the slots, an electric circuit connected to said solenoid and a switch in said circuit which is connected to and controlled by the movable carriage, whereby the switch is caused to close and the solenoid is energized when the carriage moves toward the pattern and blank and whereby it is caused to open and to de-energize the solenoid when the carriage moves away from the pattern and blank, a pair of L-shaped clamping members, each forming one wall of one of said slots, arms pivotally mounted on said frame and connected to said clamping members, each of said arms comprising at least two parts which are tensionally held together, a cam connected to said movable carriage for engagement with said arms when the carriage moves toward the pattern and blank, to cause said arms to pivot and thereby to move said clamping members into clamping position relative to said pattern and blank, said cam being itself pivotally mounted on the carriage for equalizing the force which it exerts upon said arms, and tension means connected to said clamping members to move them out of clamping position relative to the pattern and blank when the carriage moves away from said pattern and blank and its said cam is thereby withdrawn from engagement with said arms.

2. In a key duplicating machine, a fixed support for a pattern and a fixed support for a blank, a pattern follower and a blank cutter which are mounted for movement both horizontally and vertically toward and away from said pattern and blank, driven means mounted with and connected to said pattern follower and blank cutter for moving them into operative engagement with said pattern and blank and for moving them out of engagement with said pattern and blank, a pair of cam-actuated clamps for the pattern and blank, each clamp comprising a fixed jaw, a movable jaw, a bell crank abutting said movable jaw, a cam engaging said bell crank to cause it to push the movable jaw toward the fixed jaw and into clamping position relative thereto, and a frame connecting the cams to the pattern follower and blank cutter to cause said cams to move integrally with said pattern follower and blank cutter in their movement relative to the pattern and blank.

3. In a key duplicating machine, fixed supports for a pattern and a blank, a pattern follower, a blank cutter, supports for said follower and cutter, said latter supports being mounted for horizontal movement and for pivotal movement on a horizontal axis toward and away from said pattern and blank, motor-driven means connected to and movable with said latter supports for moving them and the follower and cutter horizontally toward and away from the pattern and blank, a counterweight connected to and movable with said latter supports for pivoting them in the direction of said pattern and blank to bring the follower and cutter into operative engagement with said pattern and blank, a pair of cam-actuated clamps for the pattern and blank, each clamp comprising a fixed jaw, a movable jaw, a bell crank situated for engagement with said movable jaw, a cam which is movable into and out of engagement with said bell crank to actuate the bell crank and thereby to apply a pushing force against the movable jaw to move said jaw toward the fixed jaw and into clamping position relative thereto, tension means being provided to move the movable jaw away from the fixed jaw and out of clamping position relative thereto when the cam disengages the bell crank, and a frame connecting the cams to the pattern follower and blank cutter to cause said cams to move integrally with said pattern follower and blank cutter in their movement relative to the pattern and blank, such movement of the cams bringing them into and out of engagement with the clamps to actuate said clamps in synchronization with the engagement of the pattern follower and blank cutter with the pattern and blank.

4. In a key duplicating machine, a pair of cam-actuated clamps for the pattern and blank, each clamp comprising a fixed jaw, a movable jaw, a bell crank situated for engagement with said movable jaw, and a cam which is movable into and out of engagement with said bell crank to actuate the bell crank and thereby to apply a pushing force against the movable jaw to move said jaw toward the fixed jaw and into clamping position relative thereto, tension means being provided to move the movable jaw away from the fixed jaw and out of clamping position relative thereto when the cam disengages the bell crank, said bell crank being articulated and provided with adjustable tension means for tensionally holding the articulated parts of said bell crank in predetermined relationship toward each other, such relationship being subject to change against the action of said last mentioned tension means when the movable clamping jaw engages a pattern or blank of greater than average thickness.

LESTER SEJARTO.
SAMUEL J. STOLL.

References Cited in the file of this patent

UNITED STATES PATENTS

| Number | Name | Date |
| --- | --- | --- |
| 1,906,577 | Groene | May 2, 1933 |
| 2,148,668 | Yoskowitz et al. | Feb. 28, 1939 |
| 2,352,608 | Archer | July 4, 1944 |
| 2,467,575 | Stolove | Apr. 19, 1949 |